2,733,243
5-CARBOALKOXY-4-ALKYL-2-THIAZOLYL-MERCAPTO-S-TRIAZINES

John J. D'Amico, Charleston, W. Va., assignor to Monsanto Chemical Company, St. Louis, Mo., a corporation of Delaware No Drawing. Application March 19, 1953,
Serial No. 343,507

7 Claims. (Cl. 260—248)

The present invention relates to new compositions and to methods for their preparation. More particularly this invention relates to 5-carboalkoxy-4-alkyl-2-thiazolyl-mercapto-s-triazines. This class of compounds comprises the nucleus

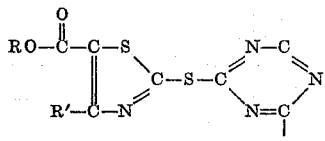

where R and R' represent alkyl groups, as for example methyl, ethyl, propyl, butyl, amyl, heptyl, hexyl, octyl, nonyl, decyl and dodecyl groups, or alicyclic groups, as for example cyclohexyl, or aralkyl groups, as for example benzyl. It is preferred, however, that R and R' represent alkyl groups containing from one to four carbon atoms inclusive.

The compounds of this invention are obtained by condensing cyanuric chloride with a suitable thiazolethiol conveniently in the form of an alkali metal salt, alkali chloride being removed in the condensation. All three chlorine atoms of the cyanuric chloride nucleus can be replaced by thiazolethiol substituents. However, one or two chlorine atoms can be replaced by other substituents.

Condensation of cyanuric chloride with primary aromatic amines has been known at least since 1886. Products prepared by condensing one or two molecular proportions of a primary aromatic amine with cyanuric chloride are also suitable intermediates for the preparation of useful products. The remaining chlorine is replaced by a thiazolethiol substituent. Suitable primary aromatic amines include aniline, β-naphthylamine, o-toluidine and p-toluidine. Fries, Ber. 19, 2056 (1886) describes the condensation of one mole of cyanuric chloride and two moles of β-naphthylamine. The product, which has a melting point of 184–186° C., condenses with 4-alkyl-5-carboalkoxy-thiazolethiol producing a resinous product having valuable accelerating properties in the process of vulcanizing rubber.

The 5-carbalkoxy-4-alkyl-2-thiazolethiols are prepared by condensing a suitable ester of α-chloroacetoacetate with ammonium dithiocarbamate. 5 - carbethoxy - 4-methyl-2-thiazolethiol was prepared by condensing ethyl-α-chloroacetoacetate (resulting from the action of sulfuryl chloride on ethyl acetoacetate at 0–5° C., colorless liquid, B. P. 97–98° C./20 mm.) with ammonium dithiocarbamate. It is a white solid, M. P. 151–152° C. after recrystallization from benzene. Substituting methyl acetoacetate in the reaction and condensing methyl-α-chloroacetoacetate with ammonium dithiocarbamate yielded 5-carbomethoxy-4-methyl-2-thiazolethiol, a white solid, M. P. 179–180° C. after recrystallization from benzene. Similarly butyl-α-chloroacetoacetate gave 5-carbobutoxy-4-methyl-2-thiazolethiol, white solid, M. P. 113° C. after recrystallization from alcohol.

The following examples illustrate in detail the preparation of the new compounds but are not to be taken as limitative.

EXAMPLE 1

A solution was prepared by admixing 50.9 grams (0.25 mole) of 5-carbethoxy-4-methyl-2-thiazolethiol, 14 grams (0.25 mole) of potassium hydroxide and 400 ml. of acetone. To the solution so prepared there was added dropwise over a period of about ten minutes a solution of 15.4 grams (0.0833 mole) of cyanuric chloride in 250 ml. of acetone. An exothermic reaction set in, the temperature rising from 25 to 40° C. in two minutes. The reaction mixture was heated at 55–56° C. for four hours and then cooled to 25° C. the precipitated solids were collected by filtration, washed with water until the washings tested free of chloride ions and then dried at 50° C. The dry product was a tan solid, M. P. 194–196° C. The yield was 67% of theoretical. After recrystallization from benzene the 2,4,6-tris(5-carbethoxy-4-methyl-2-thiazolylmercapto)-s-triazine melted at 202–204° C. Analysis gave 12.43% nitrogen and 27.95% sulfur as compared to 12.27% nitrogen and 28.09% sulfur calculated for $C_{24}H_{24}N_6O_6S_6$.

EXAMPLE 2

A solution was prepared by admixing 75.4 grams (0.4 mole) of 5-carbomethoxy-4-methyl-2-thiazolethiol, 22.4 grams (0.4 mole) of potassium hydroxide and 480 ml. of acetone. To the solution so prepared there was gradually added a solution of 24.5 grams (0.133 mole) of cyanuric chloride in 400 ml. of acetone. The reaction was carried out and the product isolated all as described in the foregoing example to yield 92.9% of theoretical of 2,4,6-tris(5-carbomethoxy-4-methyl-2-thiazolylmercapto)-s-triazine. It was a cream colored solid melting at 256–257° C. after recrystallization from benzene. Analysis gave 12.90% nitrogen and 29.68% sulfur as compared to 13.08% nitrogen and 29.93% sulfur calculated for $C_{21}H_{18}N_6O_6S_6$.

EXAMPLE 3

A solution was prepared by admixing 108 grams (0.467 mole) of 5-carbobutoxy-4-methyl-2-thiazolethiol, 26 grams (0.467 mole) of potassium hydroxide and 400 ml. of acetone. To the solution so prepared a solution of 29 grams (0.156 mole) of cyanuric chloride in 400 ml. of acetone was added gradually. The reaction was carried out and the product isolated as described in Example 1. The yield of 2,4,6-tris(5-carbobutoxy-4-methyl-2-thiazolylmercapto)-s-triazine was 61.7% of theoretical. It was a cream colored solid melting at 114–115° C. without recrystallization. Analysis gave 10.93% nitrogen and 25.11% sulfur as compared to 10.93% nitrogen and 25.02% sulfur calculated for $C_{20}H_{36}N_6O_6S_6$.

The compounds of this invention possess useful accelerating properties in the vulcanization of rubber articles, either natural or synthetic. They are particularly efficacious when used in conjunction with basic activators such as diphenyl guanidine, di-o-tolyl guanidine, butylaldehyde-aniline, diphenyl guanidine phthalate and the like as auxiliary accelerators. As exemplary of the accelerating activity vulcanizable compositions were compounded comprising

| Stock | A | B | C | D |
|---|---|---|---|---|
| Smoked sheets rubber _____ parts by weight | 100 | 100 | 100 | 100 |
| Zinc oxide_____do____ | 5 | 5 | 5 | 5 |
| Stearic acid_____do____ | 1 | 1 | 1 | 1 |
| Sulfur_____do____ | 3 | 3 | 3 | 3 |
| 2,4,6 - tris(5 - carbethoxy - 4 - methyl - 2 - thiazolylmercapto)-s-triazine__parts by weight__ | 1 | | 0.7 | |
| 2,4,6-tris(5-carbomethoxy-4-methyl-2-thiazolylmercapto)-s-triazine_parts by weight___ | | 1 | | 0.7 |
| Diphenyl guanidine_____do____ | | | 0.3 | 0.3 |

The stocks so compounded were cured in the usual manner by heating in a press for different periods of time at 135° C. The physical properties of the vulcanizates are set forth below:

Table 1

| Stock | Cure Time in Mins. | Modulus of Elasticity in lbs./in.$^2$ at Elongation of 500% | Tensile at Break in lbs./in.$^2$ | Ultimate Elongation, Percent |
|---|---|---|---|---|
| A | 15 | 80 | 486 | 946 |
| B | 15 | no cure | | |
| A | 45 | 255 | 1,790 | 900 |
| B | 45 | 230 | 1,260 | 860 |
| A | 90 | 370 | 2,700 | 850 |
| B | 90 | 405 | 2,540 | 835 |
| C | 15 | 716 | 4,173 | 766 |
| D | 15 | 955 | 3,900 | 760 |
| C | 45 | 990 | 3,600 | 720 |
| D | 45 | 1,206 | 4,043 | 700 |
| C | 90 | 945 | 3,670 | 700 |
| D | 90 | 1,040 | 3,730 | 735 |

It is indtended to cover all changes and modifications of the examples of the invention herein chosen for purposes of disclosure which do not constitute departures from the spirit and scope of the invention.

What is claimed is:

1. A 2,4,6 - tris(5 - carboalkoxy - 4 - methyl - 2 - thiazolylmercapto)-s-triazine wherein the alkoxy groups contain less than five carbon atoms.

2. 2,4,6 - tris(5 - carbomethoxy - 4 - methyl - 2 - thiazolylmercapto)-s-triazine.

3. 2,4,6 - tris(5 - carbethoxy - 4 - methyl - 2 - thiazolylmercapto)-s-triazine.

4. 2,4,6 - tris(5 - carbobutoxy - 4 - methyl - 2 - thiazolylmercapto)-s-triazine.

5. The method of making a 2,4,6-tris(5-carboalkoxy-4-alkyl-2-thiazolylmercapto)-s-triazine which comprises condensing one molecular proportion of cyanuric chloride with three molecular proportions of an alkali metal salt of a 5-carboalkoxy-4-methyl-2-thiazolethiol in which the alkoxy group contains less than five carbon atoms.

6. A natural rubber product which has been vulcanized in the presence of 2,4,6-tris(5-carbomethoxy-4-methyl-2-thiazolylmercapto)-s-triazine.

7. A natural rubber product which has been vulcanized in the presence of 2,4,6-tris(5-carbethoxy-4-methyl-2-thiazolylmercapto)-s-triazine.

References Cited in the file of this patent

UNITED STATES PATENTS 2,455,528    Seymour _____ Dec 7, 1948